3,446,803
DITHIOCARBOXYLATED CEPHALOSPORINS
Earle M. Van Heyningen, Indianapolis, Ind., assignor to Eli Lilly and Company, Indianapolis, Ind., a corporation of Indiana
No Drawing. Filed Jan. 18, 1965, Ser. No. 426,440
Int. Cl. C07d 99/24; A61k 21/00
U.S. Cl. 260—243         11 Claims This invention relates to novel organic compounds and to methods for their preparation and use.

The novel compounds of the present invention are antibiotic substances having the characteristic ring structure of cephalosporin C but having a xanthate-derived moiety in the 3 position instead of the acetoxymethyl group of cephalosporin C. The novel compounds are represented by the following formula:

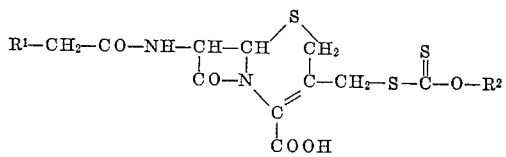

in which $R^1$ is hydrogen, $C_1$–$C_7$ alkyl, $C_1$–$C_7$ alkoxy, $C_1$–$C_7$ alkylmercapto, phenyl, phenoxy, phenylmercapto, thienyl, furyl, benzothienyl, or benzofuryl; and $R^2$ is $C_1$–$C_{12}$ primary alkyl, $C_3$–$C_{12}$ secondary alkyl, or $C_3$–$C_7$ cycloalkyl.

Also included within the scope of the invention are the salts of the above compounds with pharmaceutically acceptable cations.

As used herein, "$C_1$–$C_7$ alkyl" refers broadly to primary, secondary, and tertiary alkyl, of both straight-chain and branched-chain configuration, including methyl, ethyl, n-propyl, isopropyl, n-butyl, isobutyl, sec.-butyl, tert.-butyl, n-amyl, isoamyl, 2-amyl, 3-ampyl, neopentyl, n-hexyl, isohexyl, 2-hexyl, n-heptyl, isoheptyl, 3-heptyl, 2-methylhexyl, and the like.

"$C_1$–$C_7$ alkoxy" refers to $C_1$–$C_7$ alkyl—O— groups wherein $C_1$–$C_7$ alkyl is as defined above.

"$C_1$–$C_7$ alkylmercapto" refers to $C_1$–$C_7$ alkyl—S— groups wherein $C_1$–$C_7$ alkyl is as defined above.

Thienyl, benzothienyl, furyl, and benzofuryl groups may be attached at either the α or β position.

"$C_1$–$C_{12}$ primary alkyl" refers to alkyl groups which, in unsubstituted form, bear two hydrogen atoms on the carbon atom at the point of attachment—e.g., methyl, ethyl, n-propyl, n-butyl, isobutyl, n-amyl, isoamyl, 2-methylpentyl, n-heptyl, 2-ethylheptyl, n-decyl, isodecyl, 4-isopropylheptyl, n-dodecyl, 4-tert.-butyloctyl, and the like.

"$C_3$–$C_{12}$ secondary alkyl" refers to alkyl groups which, in unsubstituted form, bear one hydrogen atom on the carbon atom at the point of attachment—e.g., isopropyl, sec.-butyl, 2-pentyl, 3-pentyl, 2-isopentyl, 2-hexyl, 3-hexyl, 2-isohexyl, 3-isohexyl, 3-methyl-2-pentyl, 2-octyl, 4-ethyl-2-hexyl, 4-ethyl-3-hexyl, 3-decyl, 4-isopropyl-2-heptyl, 2-dodecyl, 4-dodecyl, 4-isobutyl-3-octyl, and the like.

"$C_3$–$C_7$ cycloalkyl" refers to cyclopropyl, cyclobutyl, cyclopentyl, cyclohexyl, or cycloheptyl.

"Pharmaceutically acceptable cations" refers to the positive ionic forms of sodium, potassium, lithium, calcium, barium, magnesium, aluminum, and other metals of acceptably low toxicity level, as well as the metalloid ammonium and a variety of organic nitrogen bases, including methylammonium, dimethylammonium, trimethylammonium, tetramethylammonium, choline, the ethylammoniums, procaine, quinine, dibenzylethylenediamine, and the like.

"Halo," as used hereinafter, refers to fluoro, chloro, bromo, or iodo.

In naming the novel compounds of the invention, it is convenient to designate the characteristic saturated fused-ring β-lactam thiazine structure of the cephalosporins as "cepham,"

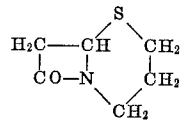

and to name the compounds as derivatives thereof, the term "cephem" referring to the basic ring structure with a single olefinic bond. According to this system, cephalosporin C itself would be named 7-(5'-aminoadipamido)-3-actoxymethyl-3-cephem-4-carboxylic acid. More informally, it is convenient to name the compounds as derivatives of a hypothetical compound, 7-amino-3-cephem-4-carboxylic acid, and to specify the differences therefrom by naming the radical attached to the CO—NH— group in the 7 position and the xanthate which is employed to replace the acetoxy group in the 3 position. Thus, 7-α-thienylacetamido - 3 - (ethoxythiocarbonylthiomethyl)-3-cephem-4-carboxylic acid is more simply designated as "α-thienylmethyl ethyl xanthate cephalosporin."

Illustrative of the compounds lying within the scope of the present invention are the following examples, which may exist either as the free acids or as salts with non-toxic pharmaceutically acceptable cations:

7-(n-butylmercaptoacetamido)-3-(n-hexyloxythiocarbonylthiomethyl)3-cephem-4-carboxylic acid 7-(α-benzothienylacetamido)-3-(isodecyloxythiocarbonylthiomethyl)3-3cephem-4-carboxylic acid 7-phenoxyacetamido-3-(methoxythiocarbonylthiomethyl)-3-cephem-4-carboxylic acid 7-n-caprylamido-3-(n-butoxythiocarbonylthiomethyl)-3-cephem-4-carboxylic acid 7-n-butyramido-3-(ethoxythiocarbonylthiomethyl)-3-cephem-4-carboxylic acid 7-acetamido-3-(n-propoxythiocarbonylthiomethyl)-3-cephem-4-carboxylic acid 7-(β-thienylacetamido)-3-(n-hexyloxythiocarbonylthiomethyl)-3-cephem-4-carboxylic acid 7-phenylmercaptoacetamido-3-(n-propoxythiocarbonylthiomethyl)-3-cephem-4-carboxylic acid 7-phenylacetamido-3-(methoxythiocarbonylthiomethyl)-3-cephem-4-carboxylic acid 7-(α-benzofurylacetamido)-3-(n-dodecyloxythiocarbonylthiomethyl)-3-cephem-4-carboxylic acid 7-(α-thienylacetamido)-3-(n-butoxythiocarbonylthiomethyl)-3-cephem-4-carboxylic acid 7-(β-benzothienylacetamido)-3-(ethoxythiocarbonylthiomethyl)-3-cephem-4-carboxylic acid 7-(α-furylacetamido)-3-(3-heptyloxythiocarbonylthiomethyl)-3-cephem-4-carboxylic acid 7-(n-propoxyacetamido)-3-(sec.-butoxythiocarbonylthiomethyl)-3-cephem-4-carboxylic acid 7-(β-benzofurylacetamido)-3-(isopropoxythiocarbonylthiomethyl)-3-cephem-4-carboxylic acid 7-(β-furylacetamido)-3-(isobutoxythiocarbonylthiomethyl)-3-cephem-4-carboxylic acid While the compounds of the present invention have been defined in terms of a structural formula which depicts the novel structural features of the claimed compounds and which indicates the presence therein of certain well-known organic radicals, including alkyl, cycloalkyl, phenyl, thienyl, benzothienyl, furyl, and benzofuryl, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are halo, hydroxy, nitro, lower alkyl, trifluoromethyl, methoxy, methylmercapto, cyano, hydroxymethyl, β-hydroxyethyl, acetyl, acetamido, and the like.

The compounds of the present invention are readily prepared from an appropriate derivative of 7-aminocephalosporanic acid (i.e., a derivative thereof having the desired acylamido group in the 7 position and the characteristic acetoxymethyl group in the 3 position) by displacement of the acetoxyl group with a xanthate of appropriate structure. The reaction is conveniently carried out by dissolving a salt of the 7-aminocephalosporanic acid compound in water, adding an aqueous solution of an alkali-metal salt of the xanthate, preferably in at least a small molar excess, and stirring and warming at ordinary or somewhat elevated temperature for several hours. The reaction may be carried out at temperatures between about 25 and about 100° C., preferably around 40 to 60° C., and for periods of about one to about 24 hours or more, the time necessary for complete reaction varying inversely with the temperature, and extended reaction times being without adverse effect under the preferred temperature conditions. The products thus obtained are generally water soluble, but may be salted out as a yellow glass by adding sodium chloride to about 50 percent of saturation, under which conditions the starting materials and by-products remain largely in solution. Many of the products are readily purified by dissolving in chloroform, washing with 50 percent-saturated aqueous sodium chloride solution to remove impurities, diluting with ether, and crystallizing.

As an alternative method, 7-aminocephalosporanic acid can be reacted with the xanthate, and the resulting intermediate can be reacted with an appropriate acylating agent to introduce the desired substituent in the 7 position.

The desired cephalosporin C starting material, having the acetoxymethyl group in the 3 position, is readily prepared by means now well-known in the art. The most convenient and economical method involves acylating 7-aminocephalosporanic acid with an acylating agent having the desired structure under conventional conditions. A convenient acylating agent is, for example, the appropriate $R^1$-substituted acetyl chloride or bromide. The acylation is carried out in water or in an appropriate organic solvent, preferably under substantially neutral conditions and preferably at reduced temperature, i.e., above the freezing point of the reaction mixture and up to about 20° C. In a typical procedure, 7-aminocephalosporanic acid is commingled with aqueous 50 volume-percent acetone and a sufficient quantity of sodium bicarbonate to promote solution, the concentration of 7-aminocephalosporanic acid being about one to about four percent by weight. The solution is cooled to around 0 to 5° C., and a solution of the acylating agent is added in about 20 percent excess, with stirring and cooling. The mixture is then allowed to warm to room temperature, after which it is acidified to around pH 2 and extracted with ethyl acetate or other immiscible organic solvent. The ethyl acetate extract is adjusted to around pH 4.5 with potassium hydroxide or other base and is back-extracted into water. The water solution is separated and evaporated to dryness. The residue is taken up in the minimum quantity of water, and the acylated product is precipitated by adding a large excess of acetone and, if necessary, ether. The crystalline material obtained thereby is filtered, washed with acetone, and dried.

The xanthates employed in the present invention are conveniently prepared by the method of Drawert, Reuther, and Born, Ber., 93, 3064 (1960). Crushed potassium hydroxide (0.1 mole) is dissolved in 100 ml. of the appropriate alcohol ($R^2OH$), with gentle warming if necessary. The solution is then cooled to 25° C., and carbon disulfide (0.7 mole) is added drop-wise, slowly, with stirring, after which the stirring is continued for one hour. An excess of ethyl ether is added, and the precipitated xanthate is filtered off. The products can generally be purified by recrystallization from ethyl acetate or by dissolving in methanol, diluting with ether to cloudiness, and chilling to crystallize. This technique is readily applicable to the preparation of the alkali-metal salts of ethyl, n-propyl, isopropyl, n-butyl, n-hexyl, cyclopentyl, cyclohexyl, and the other xanthates employed in the present invention.

The invention will be more readily understood from the following operating examples, which are submitted as illustrations only, and not by way of limitation.

In all cases, the following procedure was employed with only slight variations to prepare the designated compound. A 0.0012 mole portion of the appropriately substituted sodium 7-acylamidocephalosporanate and an equimolar amount of the appropriate potassium xanthate were dissolved in 10 ml. of water and heated at 40–45° C. in a thermostated oil bath for 24 hours, at the end of which time the solution was generally clear. The product was precipitated as a yellow glass by addition of an equal volume of aqueous saturated sodium chloride solution and chilling for several hours. The supernatant solution was decanted from the solid phase and the solid was dissolved in 25 to 50 ml. of chloroform. The chloroform solution was washed about 10 times with successive 12–15 ml. portions of 50 percent saturated aqueous sodium chloride solution. In some cases, especially toward the end of the wash, troublesome emulsions were formed, but were readily broken by centrifuging. The washing was conveniently followed by qualitative ultraviolet spectra of the wash solutions; disappearance of the spectrum for starting material and appearance of the spectrum for the product indicated when washing was complete. The washed chloroform solution was evaporated to half volume or less, then diluted with ether, and chilled. The sodium salt of the desired product separated as a fine powder, which was centrifuged and dried under vacuum.

The melting points of the products were not sharp, owing to the fact that the compounds tend to decompose at or around their melting point, and the melting points therefore vary, depending upon the temperature of the melting-point block when the compounds were first applied. All of the products, however, had infrared spectra consistent with the expected structure and gave one spot against *Bacillus subtilis* in bio-autographs of paper chromatograms, which were developed with methyl ethyl ketone saturated with water. These data, together with the ultraviolet spectra, titrations, and analyses, were sufficient to characterize the substances fully.

EXAMPLE 1

α-Thienylmethyl ethyl xanthate cephalosporin

7 - (α - thienylacetamido) - 3 - (ethoxythiocarbonyl-thiomethyl)-3-cephem-4-carboxylic acid sodium salt was obtained from 7 - (α - thienylacetamido)cephalosporanic acid and sodium ethyl xanthate. The chloroform solution was evaporated to dryness under vacuum, and the solid was recrystallized from methanol-isopropanol. Yield, 48.5 percent of theory. pK'$_a$, 5.0. Ultraviolet maxima at 223 and 284 mμ (ε=19,200 and 20,200, respectively).

*Analysis.*—Calc. for monohydrate: C, 40.95, H, 3.87, S, 25.7, Found: C, 40.52; H, 3.87; S, 26.17.

EXAMPLE 2

α-Thienylmethyl n-propyl xanthate cephalosporin

7 - (α-thienylacetamido) - 3 - (n-propoxythiocarbonylthiomethyl) - 3 - cephem - 4 - carboxylic acid sodium salt was obtained from 7-(α-thienylacetamido)cephalosporanic acid and sodium n-propyl xanthate. Yield, 45.5 percent of theory. $pK'_a$, 5.1. Ultraviolet maxima at 226 and 284 mμ ($\epsilon$=17,560 and 17,820, respectively).

*Analysis.*—Calc.: C, 43.71; H, 3.87; N, 5.66. Found: C, 43.82; H, 3.80; N, 5.49.

EXAMPLE 3

α-Thienylmethyl isopropyl xanthate cephalosporin

7 - (α - thienylacetamido) - 3 - (isopropoxythiocarbonylthiomethyl)-3-cephem-4-carboxylic acid sodium salt was obtained from 7-(α-theienylacetamido)cephalosporanic acid and sodium isopropyl xanthate, the crystallization being carried out as in Example 1. Yield, 44.5 percent of theory. $pK'_a$, 5.05. Ultraviolet maxima at 227 and 285 mμ ($\epsilon$=17,550 in both cases).

*Analysis.*—Calc.: C, 43.71; H, 3.87; N, 5.66. Found: C, 43.08; H, 4.51; N, 6.16.

EXAMPLE 4

α-Thienylmethyl n-butyl xanthate cephalosporin

7 - (α - thienylacetamido) - 3 - (n - butoxythiocarbonylthiomethyl)-3-cephem-4-carboxylic acid sodium salt was obtained from 7-(α-thienylacetamido)cephalosporanic acid and sodium n-butyl xanthate. Yield, 36.0 percent of theory. $pK'_a$, 5.07. Ultraviolet maxima at 226 and 285 mμ ($\epsilon$=17,180 and 17,280, respectively).

*Analysis.*—Calc.: C, 44.86; H, 4.16; N, 5.51. Found: C, 44.60; H, 4.28; N, 5.66.

EXAMPLE 5

α-Thienylmethyl n-hexyl xanthate cephalosporin

7 - (α - thienylacetamido) - 3 - (n - hexyloxythiocarbonylthiomethyl)-3-cephem-4-carboxylic acid sodium salt was obtained from 7-(α-thienylacetamido)cephalosporanic acid and sodium n-hexyl xanthate. Yield, 40.5 percent of theory $pK'_a$, 5.05. Ultraviolet maxima at 229 and 284 mμ ($\epsilon$=17,800 and 14,400, respectively).

*Analysis.*—Calc.: C, 46.99; H, 4.69; N, 5.22. Found: C, 47.08; H, 4.72; N, 5.39.

EXAMPLE 6

α-Thienylmethyl cyclopentyl xanthate cephalosporin

7 - (α - thienylacetamido) - 3 - (cyclopentyloxythiocarbonylthiomethyl)-3-cephem-4-carboxylic acid sodium salt was obtained from 7-(α-thienylacetamido)cephalosporanic acid and sodium cyclopentyl xanthate. Yield, 37.0 percent of theory. $pK'_a$, 5.05. Ultraviolet maxima at 228 and 285 mμ ($\epsilon$=18,180 and 17,100, respectively).

*Analysis.*—Calc.: C, 46.13; H, 4.06; N, 5.38. Found: C, 46.39; H, 4.07; N, 5.39.

EXAMPLE 7

α-Thienylmethyl cyclohexyl xanthate cephalosporin

7 - (α - thienylacetamido) - 3 - (cyclohexyloxythiocarbonylthiomethyl)-3-cephem-4-carboxylic acid sodium salt was obtained from 7-(α-thienylacetamido)cephalosporanic acid and sodium cyclohexyl xanthate. Yield, 40.0 percent of theory. $pK'_a$, 5.02. Ultraviolet maxima at 230 and 286 mμ ($\epsilon$=18,500 and 17,900, respectively).

*Analysis.*—Calc.: C, 47.17; H, 4.33; N, 5.24. Found: C, 46.95; H, 4.35; N, 5.28.

EXAMPLE 8

α-Thienylmethyl β-methoxyethyl xanthate cephalosporin

7 - (α - thienylacetamido) - 3 - (β - methoxyethoxythiocarbonylthiomethyl) - 3 - cephem - 4 - carboxylic aicd sodium salt was obtained from 7 - (α-thienylacetamido) cephalosporanic acid and sodium β-methoxyethyl xanthate. Yield, 20 percent of theory; recrystallized from n-butanol. $pK'_a$, 5.0. Ultraviolet maxima at 229 and 284mμ ($\epsilon$=13,250 and 11,600, respectively).

EXAMPLE 9

Phenylmercaptomethyl ethyl xanthate cephalosporin

7 - phenylmercaptoacetamido - 3 - (ethoxythiocarbonylthiomethyl) - 3 - cephem - 4 - carboxylic acid sodium salt was obtained from 7 - phenylmercaptoacetamidocephalosporanic acid and sodium ethyl xanthate. Yield, 13.2 percent of theory. $pK'_a$, 5.1. Ultraviolet maxima at 250 and 284 mμ ($\epsilon$=12,620 and 15,560, respectively).

*Analysis.*—Calc.: C, 45.04; H, 3.78; N, 5.53. Found: C, 45.92; H, 4.12; N, 5.78.

EXAMPLE 10

Chloromethyl ethyl xanthate cephalosporin

7 - aminocephalosporanic acid (5.2 g., 0.0175 mole) was dissolved in 125 ml. of water by adjusting the solution to pH 8 with 1 N potassium hydroxide. Potassium ethyl xanthate (3.1 g., 0.019 mole) was then added, and the mixture was heated at 40° C. for 60 hours. The reaction product mixture was chilled for several hours and the solid was filtered off and dried under vacuum. Yield, 1.23 g. of impure product. The infrared spectrum, ultraviolet spectrum, and elemental analyses indicated that the desired product, 7 - chloroacetamidocephalosporanic acid, had been formed.

A 1.0-gram portion of the impure material (approximately 0.0028 mole) was dissolved in 50 ml. of water and 50 ml. of acetone, sodium carbamate was added (0.925 g., 0.011 mole), and the mixture cooled in an ice bath, after which a solution of chloroacetyl chloride (630 mg., 0.0056 mole) in 10 ml. of acetone was added drop-wise over a period of ½ hour. The reaction mixture was thereafter concentrated under vacuum in a rotary evaporator to remove the acetone. The residual water solution (pH 5) was layered with ethyl acetate and quickly adjusted to pH 2 with 1 N hydrochloric acid. The ethyl acetate layer was separated, washed twice with cold water, and back-extracted into a sufficient quantity of 1 N sodium hydroxide to adjust the pH of the mixture to 6.5. The aqueous extract was separated and evaporated to dryness under vacuum in a rotary evaporator. The residue, after being thoroughly dried under vacuum, was dissolved in warm methanol. A small amount of an insoluble fraction was filtered off, and the filtrate was diluted with isopropanol and chilled. The crystalline product obtained thereby was filtered off and dried. Its ultraviolet spectrum showed a maximum at 284mμ ($\epsilon$=15,360). Titration gave $pK'_a$, 5.1, corresponding to a molecular weight of 440 (theory, 385). The infrared spectrum was consistent with the expected structure, 7-chloroacetamido - 3 - ethoxythiocarbonylthiomethyl - 3-cephem - 4 - carboxylic acid.

*Analysis.*—Calc.: C, 36.06; H, 3.25; N, 6.47. Found: C, 35.95; H, 3.27; N, 6.21.

The compounds of the present invention are antibiotic substances characterized by resistance to the destructive action of penicillinase, high activity against a variety of gram-positive pathogens, and a lesser degree of activity against many of the gram-negative pathogens.

I claim:

1. The compounds represented by the following formula:

$$R^1-CH_2-CO-NH-CH-CH\underset{CO-N\diagdown_{C}\diagup}{\overset{S}{\diagup}\diagdown}CH_2\quad C-CH_2-S-\overset{S}{\overset{\|}{C}}-O-R^2$$

$$COOH$$

wherein $R^1$ is a member of the group consisting of hydrogen, $C_1$–$C_7$ alkyl, $C_1$–$C_7$ alkoxy, $C_1$–$C_7$ alkylmercapto, phenyl, phenoxy, phenylmercapto, thienyl, furyl, benzothienyl, and benzofuryl;

and $R^2$ is a member of the group consisting of $C_1$–$C_{12}$ primary alkyl, $C_3$–$C_{12}$ secondary alkyl, and $C_3$–$C_7$ cycloalkyl;

and the salts thereof with pharmaceutically acceptable cations.

2. 7 - ($\alpha$ - thienylacetamido) - 3 - (ethoxythiocarbonylthiomethyl)-3-cephem-4-carboxylic acid.

3. 7 - ($\alpha$ - thienylacetamido) - 3 - (n - propoxythiocarbonylthiomethyl)-3-cephem-4-carboxylic acid.

4. 7 - ($\alpha$ - thienylacetamido) - 3 - (isopropoxythiocarbonylthiomethyl)-3-cephem-4-carboxylic acid.

5. 7 - ($\alpha$ - thienylacetamido) - 3 - (n - butoxythiocarbonylthiomethyl)-3-cephem-4-carboxylic acid.

6. 7 - ($\alpha$ - thienylacetamido) - 3 - (n - hexyloxythiocarbonylthiomethyl)-3-cephem-4-carboxylic acid.

7. 7 - ($\alpha$ - thienylacetamido) - 3 - (cyclopentyloxythiocarbonylthiomethyl)-3-cephem-4-carboxylic acid.

8. 7 - ($\alpha$ - thienylacetamido) - 3 - (cyclohexyloxythiocarbonylthiomethyl)-3-cephem-4-carboxylic acid.

9. 7 - ($\alpha$ - thienylacetamido) - 3 - ($\beta$ - methoxyethoxythiocarbonlythiomethyl) - 3 - cephem - 4 - carboxylic acid.

10. 7 - phenylmercaptoacetamido - 3 - (ethoxythiocarbonylthiomethyl)-3-cephem-4-carboxylic acid.

11. 7 - chloroacetamido - 3 - (ethoxythiocarbonylthiomethyl)-3-cephem-4-carboxylic acid.

References Cited

UNITED STATES PATENTS 3,239,515   3/1966   Heynigen _____ 260—243

NICHOLAS S. RIZZO, *Primary Examiner.*

U.S. Cl. X.R.

424—246